US005596700A

United States Patent [19]

Darnell et al.

[11] Patent Number: 5,596,700
[45] Date of Patent: Jan. 21, 1997

[54] SYSTEM FOR ANNOTATING SOFTWARE WINDOWS

[75] Inventors: Michael J. Darnell; Elissa D. Smilowitz, both of Aptos, Calif.

[73] Assignee: International Business Machines Corporation, Armonk, N.Y.

[21] Appl. No.: 18,679

[22] Filed: Feb. 17, 1993

[51] Int. Cl.$^6$ .................................................. G06F 3/14
[52] U.S. Cl. ........................................ 395/340; 395/326
[58] Field of Search ...................................... 395/139, 157, 395/159, 161, 164, 800, 600, 650, 700

[56] References Cited

U.S. PATENT DOCUMENTS

| | | | |
|---|---|---|---|
| 4,424,575 | 1/1984 | Clarke et al. | 364/900 |
| 5,226,117 | 7/1993 | Miklos | 395/157 |
| 5,315,703 | 5/1994 | Matheny et al. | 395/164 |
| 5,339,392 | 8/1994 | Risberg et al. | 395/161 |
| 5,363,507 | 11/1994 | Nakayama et al. | 395/800 |
| 5,367,623 | 11/1994 | Iwai et al. | 395/157 |
| 5,377,317 | 12/1994 | Bates et al. | 395/157 |

FOREIGN PATENT DOCUMENTS

WO9015380 12/1990 WIPO ............................... G06F 3/14
WO92/21091 11/1992 WIPO .

OTHER PUBLICATIONS

IBM Technical Disclosure Bulletin, "Technique for Annotating a Document Page" vol. 34, No. 10b, Mar. 1992, New York, USA pp. 53–54.
Research Disclosure, "Using a Highlighter on Shared Computer Documents", vol. 318, No. 28, Oct. 1990, EMSWORTH, GB p. 819, XP184660.
Patent Abstracts of Japan, vol. 14, No. 400 (P–1098), Aug. 29, 1990 & JP–A–02 151 923, Hitachi Ltd. et al., Jun. 11, 1990 (abstract).
Barker et al., "Method for Interactively Entering Comment Data Into Documents", IBM Tech. Discl. Bulletin, vol. 27, No. 9, p. 5119 (1985).
Holzman, "On–Line Highlighting and Margin Notes", IBM Tech. Discl. Bulletin, vol. 34, No. 10A, pp. 481–484 (1992).
Seaburg, "Background Scribble Pad for OS/2 Desktop", IBM Tech. Discl. Bulletin, vol. 34, No. 2, pp. 155–157 (1991).
Najjar, "Quicknote Function to Add Short Notes to a Display", IBM Techn. Discl. Bulletin, vol. 33, No. 8, pp. 258–259 (1991).

*Primary Examiner*—Mark R. Powell
*Assistant Examiner*—Ruay Lian Ho
*Attorney, Agent, or Firm*—Merchant, Gould, Smith, Edell, Welter & Schmidt

[57] ABSTRACT

The invention is a system for creating annotations (notes) from text entered by a user. The notes are permanently and persistently associated with a title text in a window and are either displayed or hidden along with the window having the associated title text. The title of the window, the note position and the note text are stored in nonvolatile storage as a note record, preferably along with all other note records to form a note dictionary. Thereafter, when each new window having a title is displayed, the system compares the new window title with each note title previously recorded. If the new title is the same as any note titles, then the note text is displayed at the note position. When a window is closed or altered in a way that would affect the way that the notes should be displayed, the system searches the note records to find all notes being displayed on the particular window and processes them accordingly. For example, if the window is being closed, then all associated notes are hidden.

18 Claims, 7 Drawing Sheets

SYSTEM FOR ANNOTATING SOFTWARE WINDOWS

TECHNICAL FIELD

The present invention relates to methods and systems in the field of graphical user interfaces for computers, and more particularly to methods for allowing users to annotate software windows.

BACKGROUND OF THE INVENTION

It is common for personal computers and workstations to provide a graphical user-computer interface environment made up of a simulated desktop, windows and icons. The user is provided with a keyboard and a cursor movement device such as a mouse or track ball to manipulate data on the display screen. The simulated desktop establishes the desktop metaphor for the user interface. The simulated desktop is the screen or surface on which the user performs work. This "desktop" is the background on which objects (icons and windows) are placed.

Icons: Icons are small pictures which represent available objects. They can reside directly on the desktop or in windows on the desktop. An icon may represent a document a user is writing, a program, or a directory, etc. The contents of the object represented by the icon can be viewed through a window. The icon can be opened into a window.

Window: A window is a frame for viewing some object. Windows are normally standardized to provide a common framework for the variety of information with which users work. Standard components of a window are the window title bar and border. The title bar shows the title of the particular window. The title typically identifies the information (object) that is currently displayed in the window.

The user can manipulate the windows by moving them around on the desktop (screen), and sizing them. The user can also open and close windows as they perform their work. The content of each window is generally not under the control of the user, but rather is controlled by the program creating the window. It is helpful to a user to be able to write notes on windows on the desktop just as one could write notes on a piece of paper on a real desktop.

Special purpose word processing systems for attaching annotations (text and audio) to documents are known. For example, CLARKE, et al. (U.S. Pat. No. 4,424,575) describe a word processing system which allows text to be displayed with added comments separately recorded. B. A. Barker, et al. (*Method for Interactively Entering Comment Data Into Documents*, IBM Technical Disclosure Bulletin, February 1985 p.5119) describe an interactive text processing system which allows a user to selectively enter comment data which is normally hidden from view at a desired point in a text file. When the user selects the comment option from the menu displayed by the text processing system, the system inserts a window with blank lines at the destination to permit entry of the comment. When the operator ends the comment, the system inserts an icon representing the comment at the destination. In these techniques, the notes are manipulated and stored by the program which manages the application window; therefore, the technique requires that each application program be modified to implement the note function.

T. G. Holzman (*On Line Highlighting And Margin Notes*, IBM Technical Disclosure Bulletin, March 1992, p481–484) describes a user interface that provides a way for users to make and view margin notes for those documents by using "slide-out windows." To insert margin notes, the user begins by using the mouse to mark the area of a document to which the margin note will refer. The user accesses the Edit pull-down menu's "Margin note" option. The user then types a margin note into the slide-out window. The user saves a margin note by pressing the "Save" pushbutton on the margin note window. Once a margin note is closed, the note "slides" back into the document out of immediate view. A "tab" is affixed to the border of the primary window for the document. The corresponding margin note can be "slid out" anytime the user sees the indicator on the border of the primary window by simply double clicking on that tab. The note is tied to a specific portion of a document like a true margin note and is stored with the document. Since the notes are stored as part of the document, this technique cannot be applied to arbitrary objects managed by unmodified programs.

G. P. Seaburg (*Background Scribble Pad for OS/2 Desktop*, IBM Technical Disclosure Bulletin, July 1991, p.155–157) describes a program called "Scribble Pad" which creates a computerized version of the traditional desktop blotter by providing a place to write notes on the system "background" area (desktop) by using the system mouse or other pointing device. "OS/2" refers to IBM's Operating System/2.

Sticky Pad Version 3.0 is a productivity tool provided as a part of OS/2. The tool allows annotations or notes to be written. However, this tool is limited in its power in that notes are not persistent across sessions; it relies on the OS/2 window handle which exists only while the window is open. Sticky Pad allows notes to be attached to windows but is limited to that instance of the window; therefore, once the window is closed the notes lose their association with the window and are left on the desktop. For example, if a user's annotation is simply used as a reminder as to where in the document the user left off and the user closes the session and returns the next day, the notes are no longer associated with the document and the user cannot rely on the place marker note. The user must remember the associations and re-associate the notes from the desktop to the related windows.

Microsoft Corporation's commercially available Note-it program creates notes that are persistent across sessions unlike Sticky Pad; however, they lack generality. Microsoft Note-it notes are only created and displayed in the context of a Microsoft application that has enabled Object Linking and Embedding (OLE). This means that the application programmer has to actually have done some coding to enable the use of Microsoft's Note-it. Thus, it is not general to any application that displays itself in a window.

The commercially available Treadz Click-it program creates notes that are note-focused instead of object-focused. This means that one must be aware of the notes and work from them rather than focus on the task or object. For example, the Treadz user would see a bulletin board with notes displayed. The user would read each note and from the individual notes they would access the associated object to which the note referred.

In a published European Patent Office application (EP-477173) Levine, et al., describe a document processing system for combining voice with visual annotations input through the stylus and keyboard assembly for documents. A document for annotating is generated from a window of a multi-window support program running independently of the annotation program in the data processing system. Levine's annotations are not associated to any system object. The "documents" are captured display screen images of the contents of windows. The "documents" may be saved in persistent storage but there is no association between the "documents" and the original window contents. Levine's invention is, therefore, not general and cannot be used to annotate arbitrary objects.

Thus, the prior art does not provide a note facility which creates a persistent association between a note and an object in a window that is general and is focused on the object.

SUMMARY OF THE INVENTION

The invention is a system for creating annotations (notes) from text entered by a user. The notes are permanently and persistently associated with a title text in a window and are either displayed or hidden along with the window having the associated title text. The invention operates in a computer system having a graphical pointer positioning device (such as a mouse), an execute key (such as a mouse button) and support for displaying multiple windows. The "new note mode" is entered upon detecting a selected action by a user. This action may be clicking the mouse button when the pointer is located on a command field in a pull-down menu or any equivalent action. The system then allows the user to move the pointer to the location where the note is desired. This position may be inside a standard window having "title" text or it may on the base or root screen for the system which is referred to as the "desktop". When the system detects the pressing of the mouse key or other equivalent action, the title of the window is recorded as a note title and the pointer position relative to the window is recorded as a note position. The system will then accept and display text entered by the user as the note text. Preferably the user will be aided in entering the note text by having a blank note form displayed at the note position. Upon completion of the text entry, the note title, note position and note text are stored in nonvolatile storage as a note record, preferably along with all other note records to form a note dictionary. The new note mode is ended at this point. Thereafter, when each new window having a title is displayed or the desktop is displayed, the system compares the new window title with each note title previously recorded. If the new title is the same as any of the note titles in the dictionary, then the note text is displayed at the note position. When a window is closed or altered in a way that would affect the way that the notes should be displayed, the system searches the note records to find all notes being displayed on the particular window and processes them accordingly. For example, if the window is being closed, then all associated notes are hidden.

DETAILED DESCRIPTION OF THE INVENTION

The invention is a graphical user-computer interface control system which provides the ability to annotate information to computer 'objects'. The invention achieves the combination of being able to associate notes to any object represented by a window or icon, maintaining the associations in persistent storage, automatically displaying the associated notes when the object is opened, and hiding the associated notes when the object is closed. The invention provides the ability to annotate information to computer objects in a way that is general, persistent, and has an object-focus.

The invention avoids the disadvantages of the prior art techniques by providing a persistent, general purpose, object-focused association. The invention creates the association to the object viewed through the window rather than to an instance of the window, thereby providing a persistent association across sessions. The invention provides persistent associations in that associated windows can be closed, minimized or manipulated in any way or the system can be shutdown and the association persists. This allows the user to maintain the associations over time. It also relieves the user from having to manage or remember the associations, because the system automatically manages the associations for the user.

The invention's note association is general to any window. No additional support by other services is required. The invention's notes are object-focused instead of note-focused. The user is allowed to focus on the objects in a natural way and the previously recorded notes are displayed automatically. The term object is being used to refer to an object, a view or an object-view combination. For example an object could be a document, a text editor, or a document being viewed in a text editor, respectively. For example, users viewing a large document in a window could attach a note to the window to remind themselves where they left off in reading the document. The next day, upon viewing the same document, the note would automatically appear.

Figure 1:
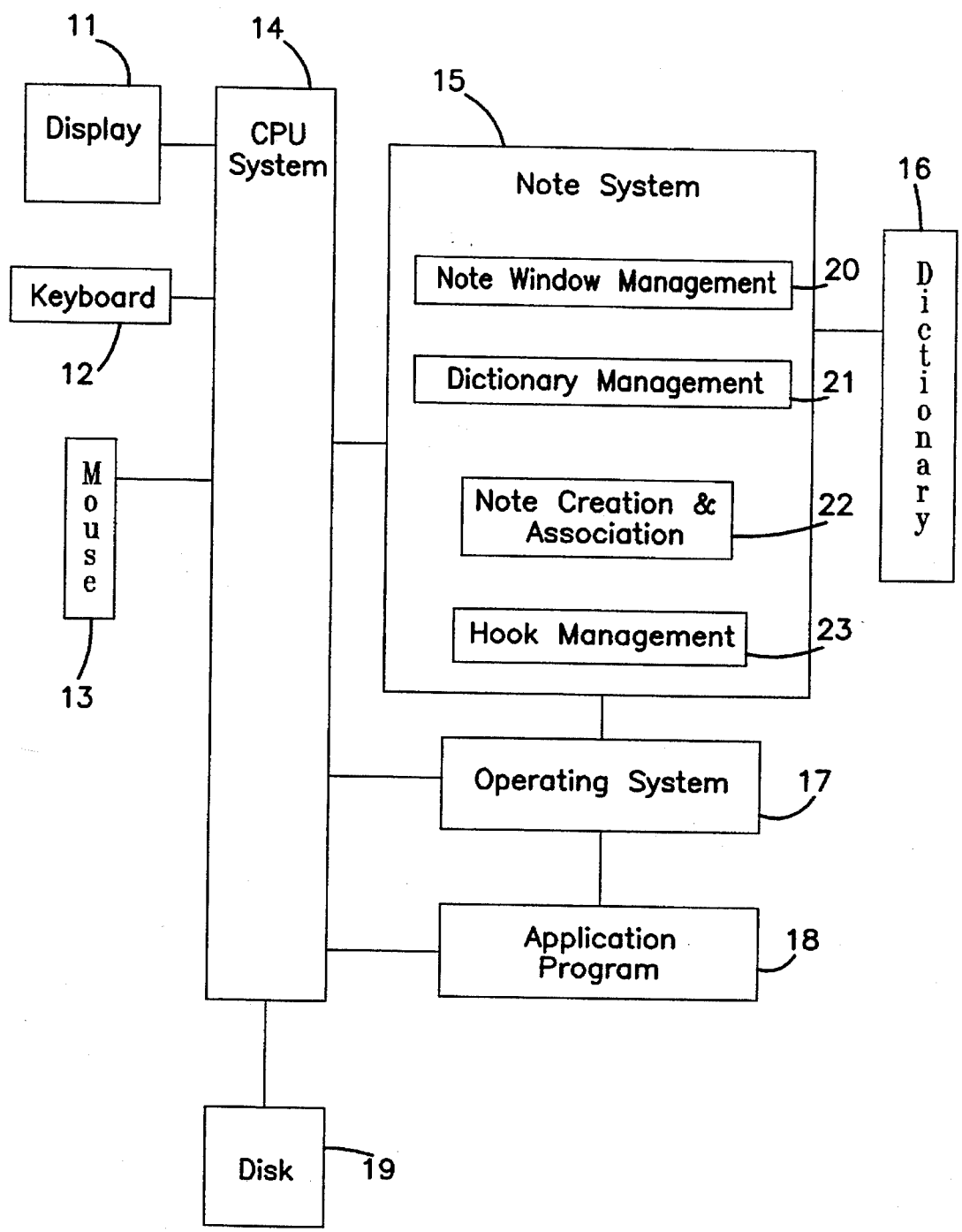
FIG. 1 is a block diagram of the system of the invention and its operating environment.

The detailed embodiment of the invention is implemented as an annotation control in the OS/2 operating system. In the preferred embodiment the annotation control is implemented in a computer program which allows a user to create notes associated with objects viewed through windows. FIG. 1 will be used to illustrate the major component parts of the system of the invention and its operating environment. The CPU system 14, disk 19, display 11, keyboard 12 and mouse 13 comprises a typical personal computer or workstation system. The CPU system includes a microprocessor, RAM and typically ROM. The operating system 17 includes functional support for multiple windows. The OS/2 operating system is of this type. The application program 18 is a source of one or more windows, but the operating system may also generate windows. The Annotation Control System (or Note System) 15 operates independently from the application program by obtaining information in the form of system messages from the operating system. These messages are captured and initially processed by the Hook Magagement System 23 which is responsible for installing and removing the "system hooks" which allow the Annotation Control System to intercept the messages. The Note Creation and Association System 22 creates the new notes and associates them to the objects being viewed through windows. The Dictionary Management System 21 adds, deletes and searches for note records which are stored in the Dictionary 16. The Note Window Management System 20 displays and hides the note windows.

Note creation and attachment

The implementation of note creation and attachment is as follows. When the user issues a command to create a new note, the annotation control system is put into 'new note' mode. For example, the user can move the graphical cursor (mouse pointer) over an icon or control bar assigned the 'new note' role and press a mouse button (known as 'clicking-on') to execute the new note function. Preferably the annotation program will cause the cursor to change its appearance as a visual indication that new note mode has been entered. The pointer can, for example, be changed to resemble a small paper note. It is also possible to assign a predetermined keystroke sequence to the new note mode so that, for example, the user might press the control key (Ctrl) and the 'n' key to activate it. After the new note mode has been started, the user optionally moves the mouse pointer to the location on the desktop or window where the new note is to be displayed, then clicks the mouse button to trigger the display of the blank note form. If the mouse pointer was positioned on a window with a title when the mouse button was clicked, then the annotation program retrieves the title of the window and creates a new note record. This record includes the note position, and note contents with the window title as the record key. This record is added to a data structure known as the note dictionary in the preferred embodiment, but any means of storing the data in a retrievable manner will work.

Figure 2:
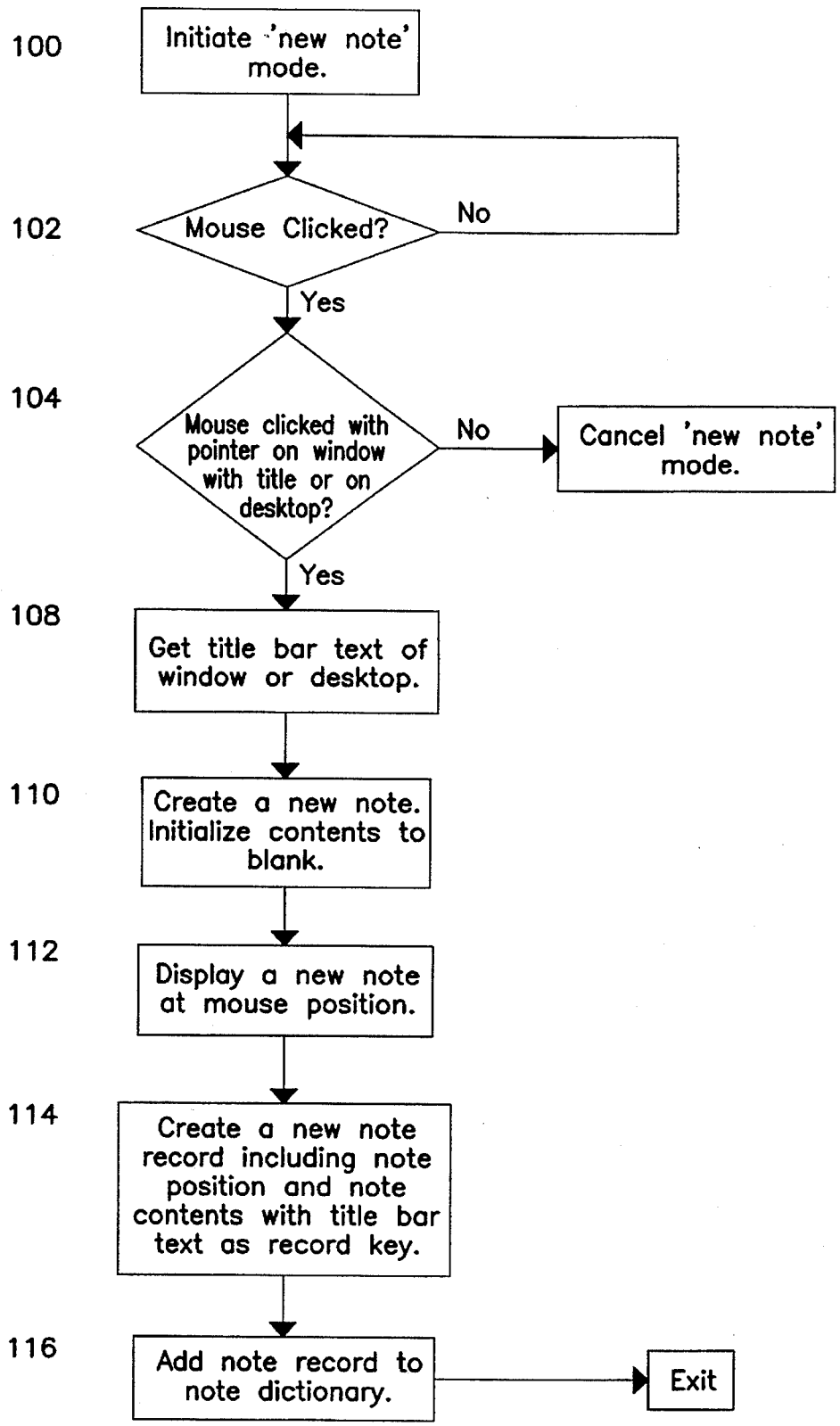
FIG. 2 is a high level flowchart for the creation and attachment of new notes.

The flowchart shown in FIG. 2 provides a schematic overview of the operation of creation and attachment of new notes in the invention. The user initiates the 'new note' mode 100. The annotation control system idles in 'new note' mode until the mouse is clicked 102. During this time, the user can position the pointer, if necessary, at a point where the note is desired. After the mouse has been clicked, the annotation program checks to see if the mouse pointer is either on a window with a title or on the desktop 104, then the title bar text of the window is retrieved 108. If the mouse pointer is not on a window with a title or on the desktop, then the 'new note' mode is canceled. The title information, window identification and mouse pointer location are standard pieces of information that are provided by windowing operating systems to application programs through callable interface. The actual techniques for obtaining the information will vary with the operating environment but are well known to those skilled in the art. Once the title bar text is obtained a new note is created, and its contents are initialized to blanks 110. The blank new note is then displayed at the mouse position 112. A new note record is created including the note position and the note contents with the title bar text as the record key 114. The note record is added to the note dictionary 116 which is preferably stored in nonvolatile storage such as a disk file.

A pseudo-code implementation of note creation and attachment is given in Table 1.

TABLE 1

Pseudo-code for the
procedure for creation and attachment of new notes.

| | |
|---|---|
| L100 | if mouse button is clicked during 'new note' mode |
| | /* New note creation */ |
| L102 | then begin |
| L104 | if mouse pointer is on window with a title bar or the desktop window |
| | /* check mouse pointer location */ |
| L106 | then begin |
| | /* Display new note and store in note dictionary */ |

TABLE 1-continued

Pseudo-code for the
procedure for creation and attachment of new notes.

| | |
|---|---|
| L108 | get title bar text of the window or desktop |
| L110 | create a new note, initialize note contents to blank |
| L112 | display new note at mouse position |
| L114 | create a new note record including note position and note contents with title bar text as record key |
| L116 | add note record to note dictionary |
| L118 | end |
| L120 | cancel 'new note' mode |
| L122 | end |

The pseudo-code program fragment for creation and attachment of new notes operates as follows. When the mouse button is clicked during the 'new note' mode (line L100), and if the mouse pointer is on either a window with a title bar or the desktop window (line L104), then the title bar text of the window or desktop is retrieved (line L108) and a new note is created with its contents initialized to blank (line L110). The new note is displayed at the mouse position (line L112). Next a new note record is created including note position, and note contents with the title bar text as the record key (line L114). The note record is then added to the note dictionary (line L116). If the mouse pointer is not on a window with a title bar or a desktop window the 'new note' mode is canceled and no further processing is performed (line L120).

The note record in the preferred embodiment contains the following:

1. the associated window's title bar text
2. time and date of note's creation
3. note contents
4. note position and size relative to the associated window
5. the associated window's window handle
6. the note window (the window displaying the note contents)
7. the note window's minimization status (window vs. icon)
8. the associated window's minimization status (window vs. icon)

The note record provides the annotation control system with the information needed to make the note both general and persistent. The persistence of notes is supported by associating each note with the title of the window, which represents the object displayed in the window, rather than the window itself. A window is temporary, existing only for as long as it is opened, wherein as object displayed in the window is permanent, existing across sessions. Associating each note with the window title also supports the generality of annotation in that the window title is a standard component of a typical window.

Automatic Displaying, Hiding, and Processing of Notes

The detailed implementation of the automatic displaying, hiding, and processing of notes is as follows. After the user starts the annotation control system, all operating system window messages are routed to the annotation control system. These messages signal events in the system including the creation and destruction of windows. The annotation control system retrieves each window message, determines if the corresponding window has a title bar, and if so whether the title is contained in the note dictionary. If the title is contained in the note dictionary, then the window message is examined to determine its type. If the message indicates that a window was created, then the annotation control system causes any notes associated to the title to be displayed. If the message indicates that a window was destroyed, then the annotation control system hides any notes associated to that title. If the message indicates that a window's title was changed, then any notes corresponding to the old title are hidden, and any notes corresponding to the new title are displayed. If the message indicates that the window was maximized, minimized, re-painted, activated, moved or re-sized, then the annotation control system causes any note associated with the title to be processed appropriately. For example, if the message indicates that the window was moved, any displayed notes associated with the window are moved in the same direction and by the same amount as the window itself. This gives the appearance that the notes are physically attached to the window.

Figure 3:
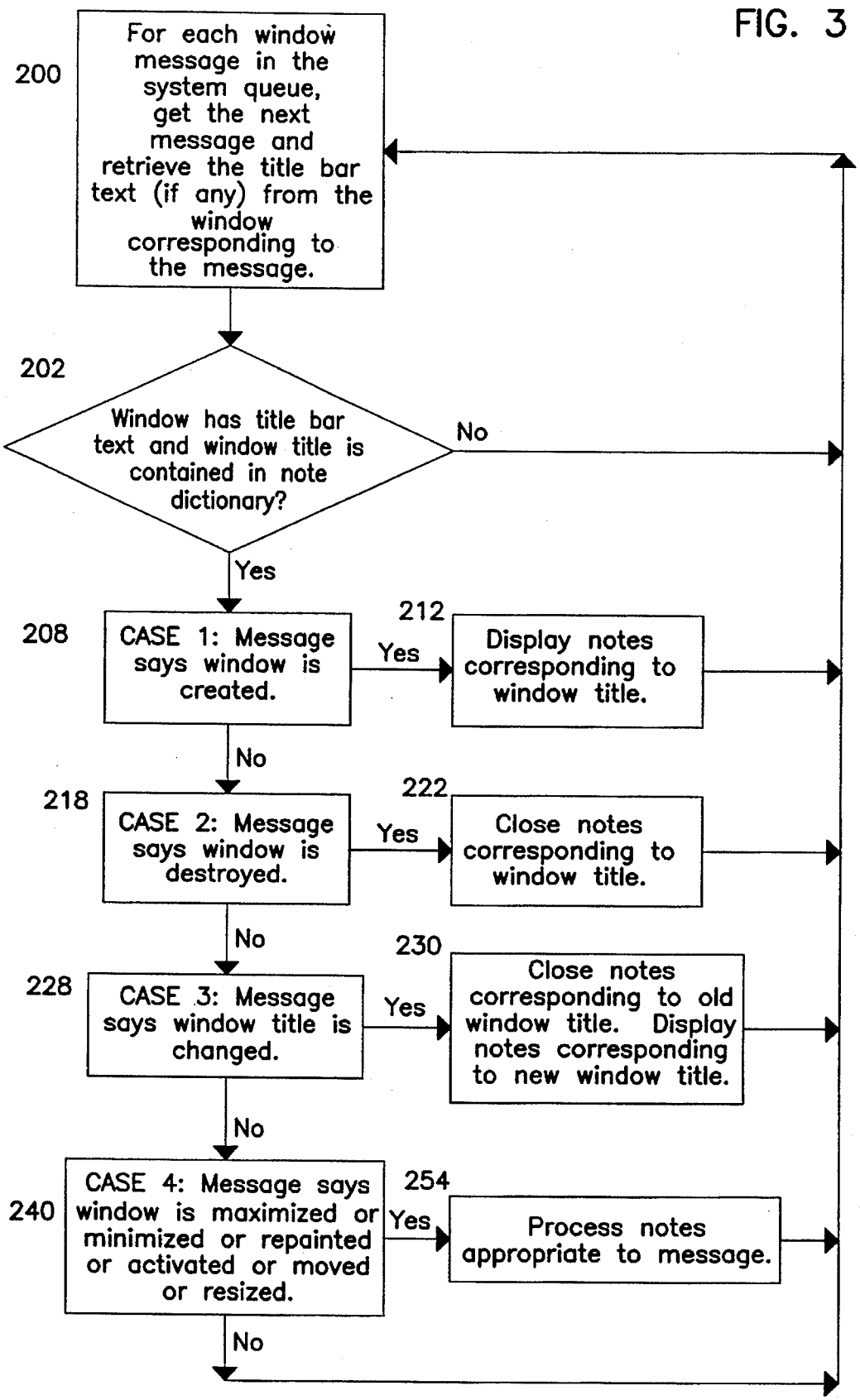
FIG. 3 is a high level flowchart of the automatic displaying, hiding and other processing of notes.

The flowchart shown in FIG. 3 provides a schematic overview of the operation for automatic displaying, hiding, and other processing of notes. The procedure shown in the flowchart is performed for each window message placed on the system message queue. The next window message on the queue is retrieved and the title bar text (if any) of the window corresponding to that message is retrieved 200. If the corresponding window has a title bar and the title is contained as a record key in the note dictionary, then further processing is determined by a case statement controlled by the particular window message retrieved 202. If either the corresponding window does not have a title bar or it is not contained in the note dictionary the next window message is retrieved from the system message queue 200.

If the window message indicates that a window was created 208, then all notes corresponding to the window tile are displayed 212. If the window message indicates that a window was destroyed 218, then all notes corresponding to the title of the destroyed window are closed (i.e., hidden) 222. If the window message indicates that the window title has changed, then all notes associated with the old window title are closed, and all notes associated with the new window title are displayed 230. If the window message indicates that a window is maximized, minimized, re-painted, activated, moved, or re-sized 240, then the notes associated with the window title are processed as appropriate to the particular window message 254. When the message is processed or if the window message does not match any of the four cases, then control returns to the beginning 200 where the next window message is retrieved.

A pseudo-code implementation of the automatic displaying, hiding and processing of notes is given in Table 2.

TABLE 2

Pseudo-code for the procedure for automatic displaying, hiding, and other processing of notes.

| | |
|---|---|
| L200 | For each window message in the system message queue |
| L202 | if window has a title bar |
| | /* Check if standard window */ |
| L204 | and window title is contained as a record key in note dictionary |
| | /* Check if window title in note dictionary */ |
| L206 | then begin case statement |
| | /* case statement */ |
| L208 | case 1: window is created |
| L210 | then begin |
| L212 | display notes corresponding to window title |
| L216 | end case 1 |
| L218 | case 2: window is destroyed |
| L220 | then begin |
| | /* hide associated notes */ |
| L222 | close notes corresponding to window title |
| L226 | end case 2 |

TABLE 2-continued

Pseudo-code for the procedure for automatic displaying, hiding, and other processing of notes.

| | |
|---|---|
| L228 | case 3: window title is changed |
| L230 | then begin |
| | /* hide notes associated with old title |
| | and display notes associated with new title */ |
| L232 | close notes corresponding to old window title |
| L234 | display notes corresponding to new window title |
| L238 | end case 3 |
| L240 | case 4: window is maximized |
| | or minimized |
| | or re-painted |
| | or activated |
| | or moved |
| | or re-sized |
| L252 | then begin |
| | /* process notes associated with window title */ |
| L254 | process notes appropriate to message |
| L258 | end case 4 |
| L260 | end /* case statement */ |
| L262 | end /* for statement */ |

The pseudo-code program fragment for automatic displaying, hiding, and other processing of notes operates as follows. This code is executed for each window message placed on the system message queue. The next window message on the queue is retrieved (line L200). If the corresponding window has a title bar (line L202), and the title is contained as a record key in the note dictionary (line L204), then further processing is determined by a case statement (lines L206–L260) controlled by the particular type of window message retrieved.

If the window message indicates that a window was created (Line 208), then all notes corresponding to the title of the created window are displayed (line L212) and control returns to line L200 where the next window message is retrieved.

If the window message indicates that a window was destroyed (line L218), then all notes corresponding to the title of the destroyed window are closed (line L222) and control returns to line L200 where the next window message is retrieved.

If the window message indicates that a window title has changed (line L228), then all notes associated with the old window title are closed (line L232), and all notes associated with the new window title are displayed (line L234) and control returns to line L200 where the next window message is retrieved.

If the window message indicates that a window was maximized, minimized, re-painted, activated, moved, or re-sized (line L240), then the notes associated with the window title are processed as appropriate to the particular window message (line L254) and control returns to line L200 where the next window message is retrieved. If the window message does not match any of the four cases, then control simply returns to line L200 where the next window message is retrieved.

The annotation program supports the persistence of notes by associating notes with the window title rather than with the window itself. This allows notes to be automatically retrieved when the window is opened. The program supports object-focus by allowing the user to focus on the objects relevant to their tasks, and automatically displaying any notes when the associated object is displayed in a window, rather than requiring the user to focus initially on the notes, and having to manually retrieve their associated objects.

Starting the Annotation Control System

This section describes the procedure for starting the annotation control system. When a user or a program issues a command to start the annotation control system, one or more standard operating system instructions are performed that enables the interception of the system queue window messages by the annotation control system. This allows the annotation control system to automatically display, hide and process notes. Next the note dictionary is read from the disk file. The note dictionary is a data structure which contains a record for each note. Each record contains a key composed of a window title and a value composed of a note. Each note is composed of the note's contents, size and position relative to a window, etc. For each record in the note dictionary, the following is done. If there is an opened window with a title corresponding to the record key, then the corresponding note is displayed.

Figure 4:
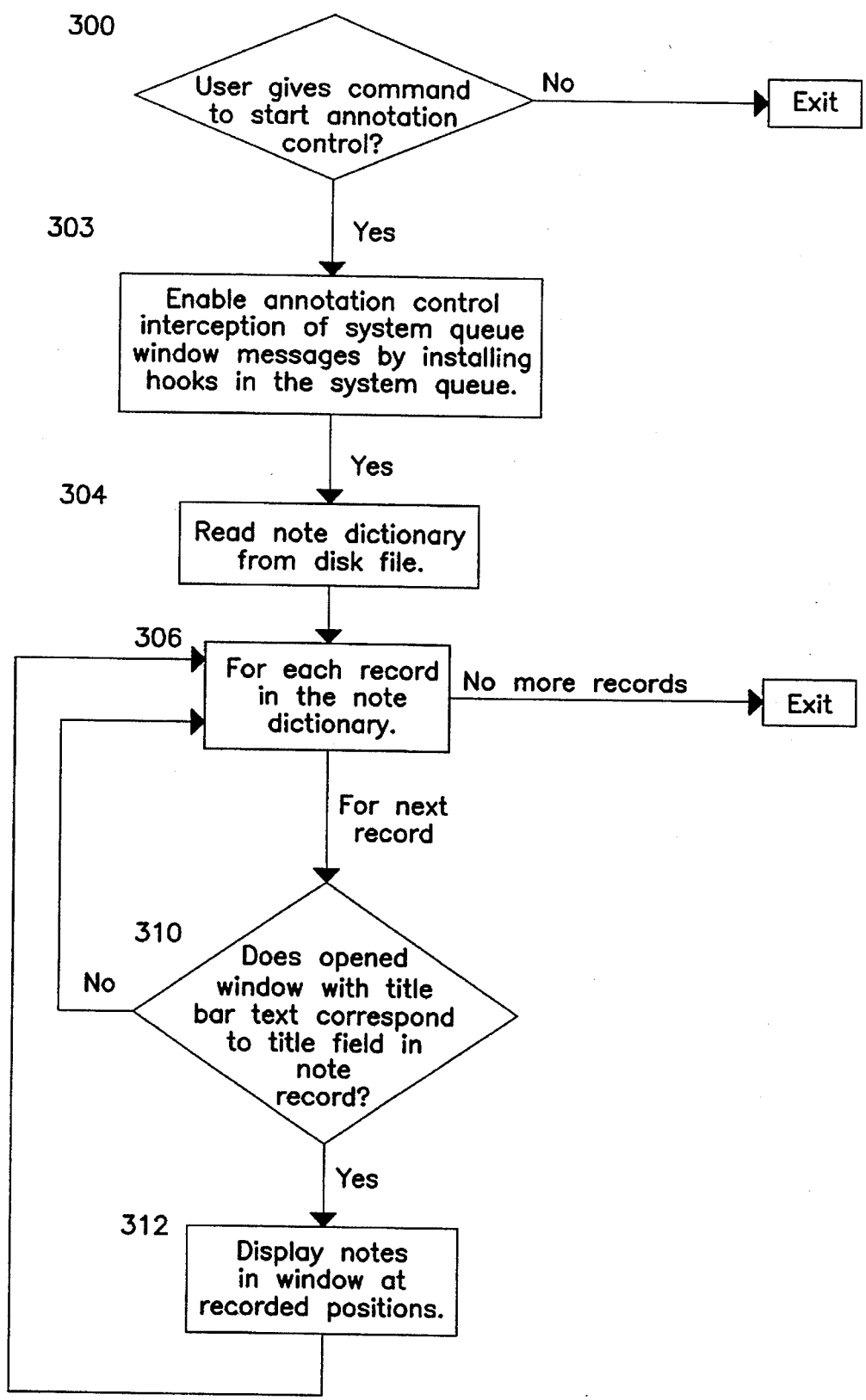
FIG. 4 is a high level flowchart of the procedure for starting the annotation control.

The flowchart shown in FIG. 4 provides a schematic overview of the procedure for starting the annotation control system. When the user issues a command to start the annotation control system 300 an instruction is performed to enable the annotation control system to intercept system queue window messages. In the detailed embodiment, the interception of messages is accomplished by installing hooks in the OS/2 system queue 30. The note dictionary is read from the disk file 304. Each record in the note dictionary is checked 306 to see if there is a window displayed on the screen with the title bar text corresponding to the title field in the note record 310. If there is an open window corresponding to the title field of the note dictionary record, then all notes corresponding to the note dictionary record are displayed at their recorded positions 312. Once all records in the note dictionary have been processed the program exits.

A pseudo-code description of the process of starting the annotation control system is given in Table 3.

TABLE 3

Pseudo-code
for procedure for starting the annotation control system.

L300 when user gives command to start the annotation control system
L302   then begin
L303     enable annotation control system interception of system queue window messages
         /* allow system window messages to be processed to allow notes to be automatically displayed, hidden, etc. */
L304     read note dictionary from disk file
L306     for each record in the note dictionary
L308       begin /* display associated notes */
L310         if there is an opened window with title bar text corresponding to the note dictionary record key
L312         then display notes corresponding to note dictionary record at proper positions
L314       end
L316 end The pseudo-code program fragment for starting the annotation control system operates as follows. When a command is issued by the user to start the annotation control system (line L300) an instruction appropriate to the particular operating environment is performed causing the system message queue window messages (or their equivalent) to be intercepted by the annotation control system (line L303). Next the note dictionary is read from the disk file (line L304). The preferred embodiment uses a "keyed" file for the dictionary, but any standard method of storing and retrieving the note records can be used. Each record in the note dictionary is checked (line L306) to see if there is a window displayed on the screen with the title bar text corresponding to the note dictionary record key (line L306). For each open window with a title corresponding to a note dictionary key, the notes corresponding to the note dictionary record are displayed using the positional information and text from the note record (line L312).

Stopping the annotation control system

Figure 5:
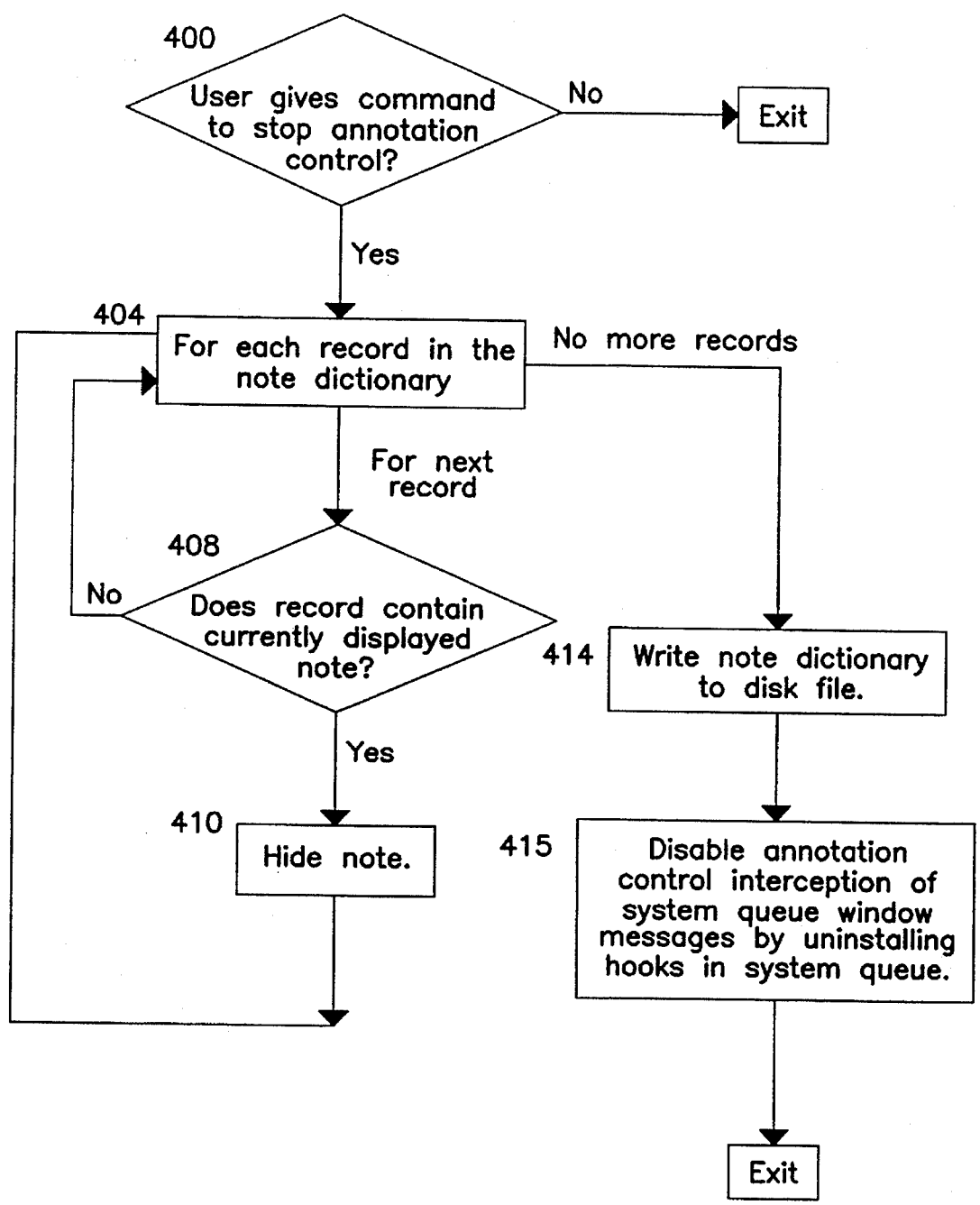
FIG. 5 is a high level flowchart of the procedure for stopping the annotation control.

The flowchart shown in FIG. 5 provides a schematic overview of the procedure for stopping the annotation control system. When the user or a program issues a command to stop the annotation control system 400, each record in the note dictionary is checked 404 to see if the note record corresponds to a currently displayed note 408. If so, the note is hidden 410. Upon completion of the processing of the records in the note dictionary, the note dictionary is written to a disk file 414. Finally, an instruction is performed causing the annotation control system to disable interception of the system queue messages. The disabling is accomplished by removing the hooks in the system queue 415.

A pseudo-code implementation of stopping the annotation control system is given in Table 4.

TABLE 4

Pseudo-code
for procedure for stopping the annotation control system

L400 if user gives command to stop annotation control system
L402   then begin /* stopping annotation control system */
L404     for each note dictionary record
L406       begin /* hide all displayed notes */
L408         if record contains a currently displayed note
L410         then hide note
L412       end
L414     write note dictionary to disk file
L415     disable annotation control system interception of system queue window messages
L416   end The pseudo-code program fragment for stopping the annotation control system operates as follows. When a command is issued by the user to stop the annotation control system (line L400) the following is done. For each record in the note dictionary (line L404) if the record contains a currently displayed note (line L408), the note is hidden (line L410). After processing the records in the note dictionary, the note dictionary is written to a disk file (line L414). Finally, an instruction is performed causing the annotation control system to discontinue interception of system queue window messages (line L415).

Example of the Use of the Annotation Control System

Figure 6:
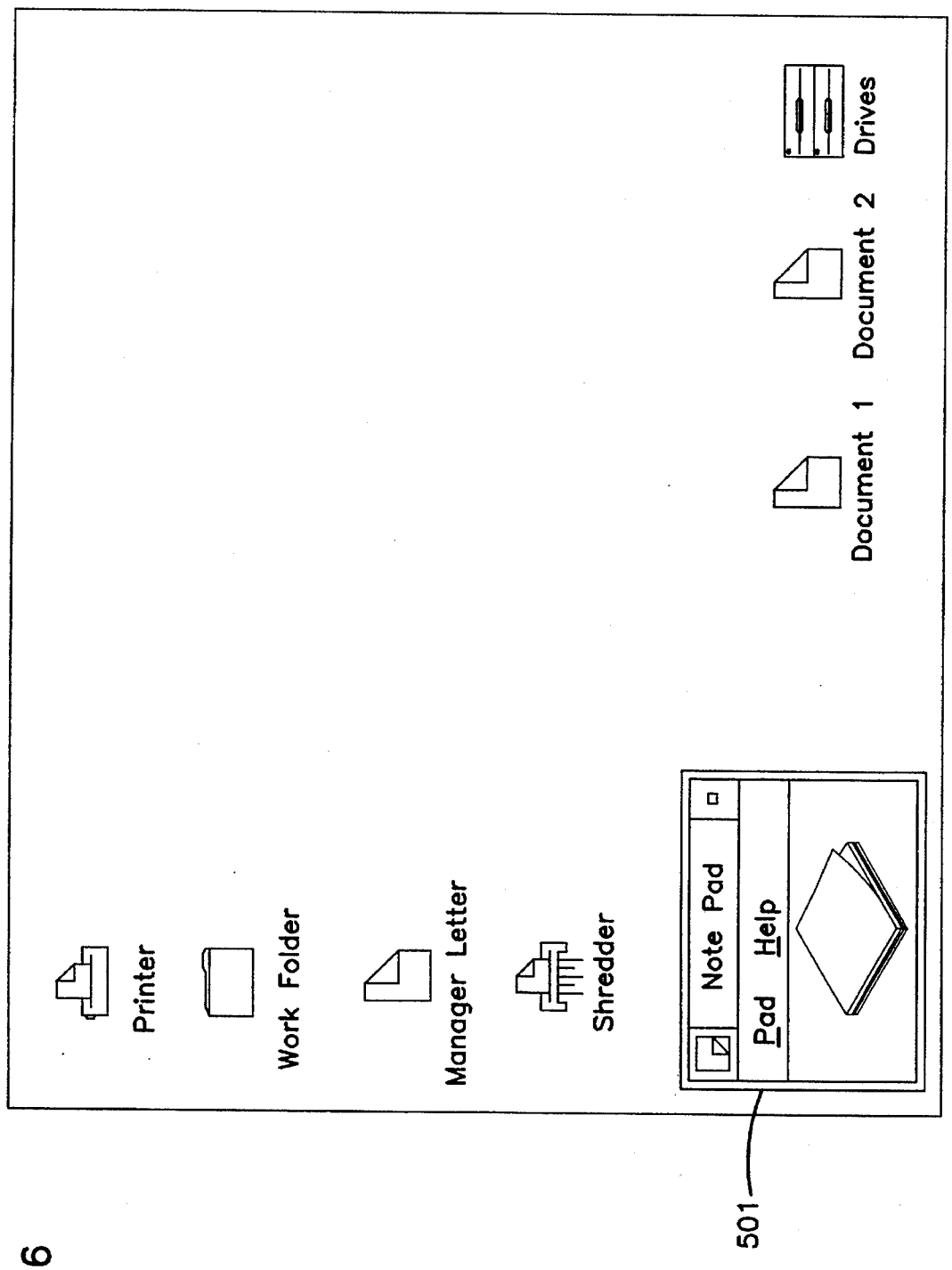
FIG. 6 is an example of a user's desktop showing the note system's window.

The following illustrates the use of the Annotation Control System in a word processing example. FIG. 6 shows an example of a user's desktop with some frequently used objects, such as the printer icon, shredder icon, and drives icon. In addition some icons representing the user's work are shown, such as Document 1, Document 2, and Manager Letter. The icons representing Document 1, Document 2, and Manager Letter can be opened into windows which display their contents. The user has already started the annotation control system, which is represented by the window titled "Note Pad" 501.

Figure 7:
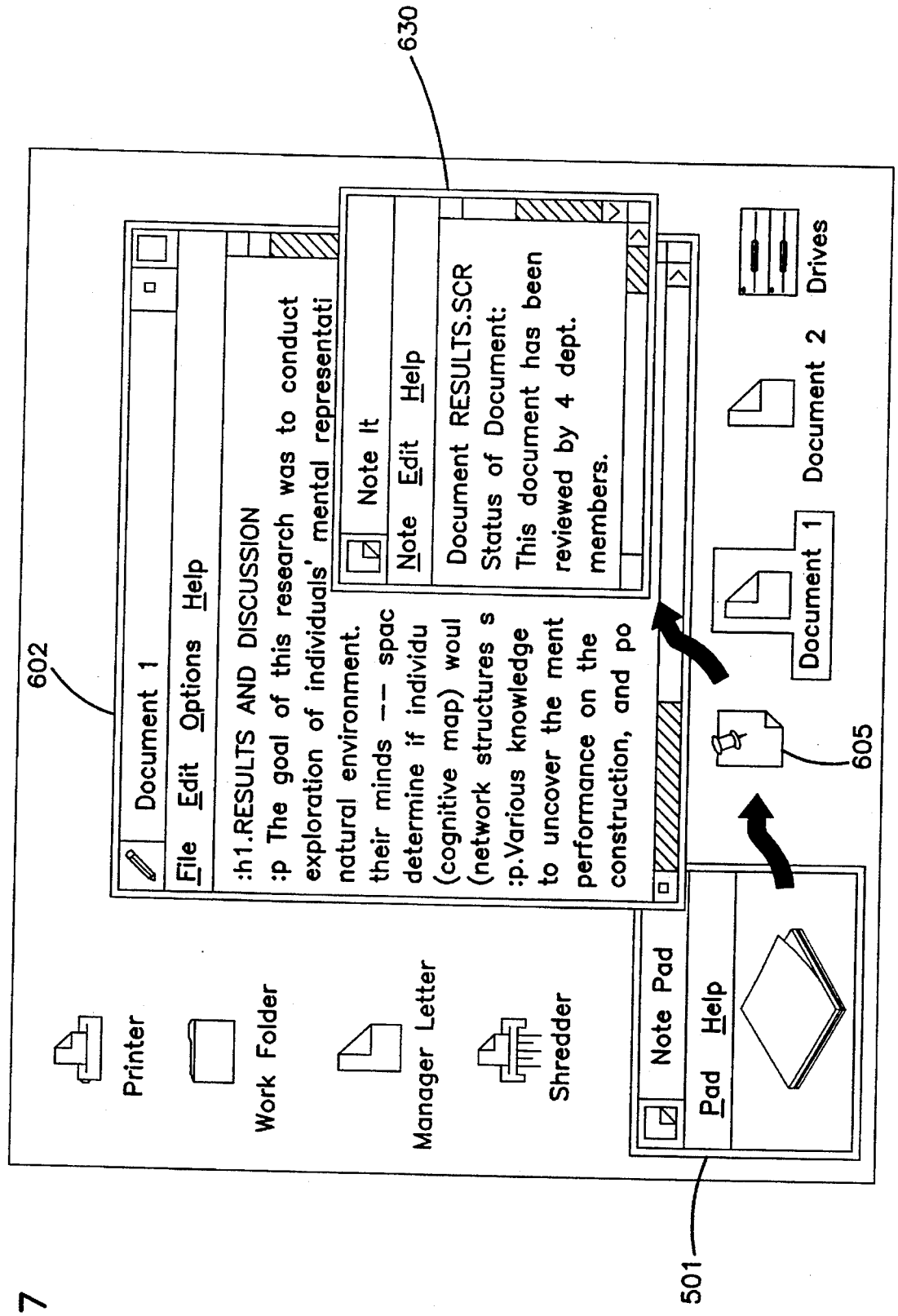
FIG. 7 is an example of a user's desktop when a note is being entered.

An example of how a note is created and associated to a window is shown in FIG. 7. The user has opened the icon labeled Document 1 into a window titled "Document 1" 602. The user initiates the creation of a new note from the Note Pad window by choosing the 'New note' choice from the 'Pad' standard pull-down menu. This causes the mouse pointer to appear as a note with a push pin 605. Then the user moves the mouse pointer to the desired location for the note. In this case the user wants to attach a note to the window displaying Document 1. The user clicks the mouse button on the window and a blank note form is displayed. The user then annotates the document by typing text into the note.

Thus, the user has created a new note 630 and attached it to the document displayed in the window titled Document 1. When the user closes the window titled Document 1, the associated note 630 will be automatically hidden. When the user reopens Document 1, the note will be re-displayed. If the user causes the title of the window to change by starting to edit another document, any notes associated with the old window title are hidden, and any notes associated with the new window title are displayed.

Using the foregoing specifications the invention may be implemented using standard programming and/or engineering techniques. The resulting program(s) may be stored on disk, diskettes, memory cards, ROM or any other memory device. For execution, the program may be copied into the RAM of the computer. One skilled in the art of computer science will easily be able to combine the software created as described with appropriate general purpose or special purpose computer hardware to create a computer system embodying the invention. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A method of operating a computer system having a processor, a memory, a nonvolatile storage, text entry means, pointer positioning means, execute key means, display means and means for displaying multiple windows, comprising the steps of:

entering a new note mode upon detecting a selected action by a user;

detecting the pressing of the execute key when the pointer is located in a portion of a window having an associated title;

recording the title of the window as a note title;

recording the pointer position relative to the window as a note position;

displaying text entered by the user as a note text at the note position;

storing the note title, note position and note text in nonvolatile storage as a note record;

exiting the new note mode; and for each new window displayed having a title, comparing the new window title with the note title and if the new title and the note title are equivalent, then displaying the note text at the note position.

2. The method of claim 1 further comprising the step of comparing, for each window being closed, the window title with the note title in each note record in the note dictionary and if the title of the window being closed and the note title are equivalent, then removing the note text from the display.

3. The method of claim 1 wherein the step of entering a new note mode further comprises detecting the pressing of the execute key to the user when the pointer is positioned on a designated portion of a window associated with a note generating program.

4. The method of claim 1 wherein the step of entering a new note mode further comprises detecting the pressing of a designated key stroke sequence by the user.

5. The method of claim 1 wherein the step of entering a new note mode further comprises altering a default pointer display in a selected manner to visually indicate new note mode and the step of exiting the new note mode further comprises restoring the default pointer display.

6. The method of claim 1 wherein the step of displaying text further comprises using selected visual display characteristics to display the note text to distinguish the note text from other text in the window or on the desktop.

7. A method of operating a computer system having a processor, a memory, a nonvolatile storage, text entry means, pointer positioning means, execute key means, display means and means for displaying multiple windows on a simulated desktop, comprising the steps of:

entering a new note mode upon detecting a selected action by a user;

detecting the pressing of the execute key when the printer is located in a portion of a window having an associated title or on the simulated desktop;

recording as a note title an indicator for the desktop or the title of the window responsive to the pointer position;

recording as a note position the pointer position relative to the window or the desktop responsive to the pointer position;

displaying text entered by the user as a note text at the note position;

storing the note title, note position and note text in nonvolatile storage as a note record in a note dictionary containing a plurality of note records;

exiting the new note mode;

for each new window displayed having a title, comparing the new window title with each note title in the note dictionary and if the new title and the note title are equivalent, then displaying the note text at the note position in the new window; and each time the desktop is displayed, displaying note text at the note position for each note record having a note title indicating the desktop.

8. The method of claim 7 further comprising the step of comparing, for each window being closed, the window title with the note title in each note record in the note dictionary and if the title of the window being closed and the note title are equivalent, then removing the note text from the display.

9. The method of claim 7 wherein the step of entering a new note mode further comprises detecting the pressing of the execute key when the pointer is positioned on a designated portion of a whole associated with a note generating program.

10. The method of claim 7 wherein the step of entering a new note mode further comprises detecting the pressing of a designated key stroke sequence.

11. The method of claim 7 wherein the step of entering a new note mode further comprises altering a default pointer display in a selected manner to visually indicate new note mode and the step of exiting the new note mode further comprises restoring the default pointer display.

12. The method of claim 7 wherein the step of displaying text mode further comprises using selected visual display characteristics to display the note text to distinguish the note text from other text in the window or on the desktop.

13. A system for generating annotations having a processor, a memory, a nonvolatile storage, text entry means, pointer positioning means, execute key means, display means and means for displaying multiple windows, comprising:

means for entering a new note mode upon detecting a selected action by a user;

means for detecting the pressing of the execute key when the pointer is located in a portion of a window having an associated title;

means for recording the title of the window as a note title;

means for recording the pointer position relative to the window as a note position;

means for displaying text entered by the user as a note text at the note position;

means for storing the note title, note position and note text in nonvolatile storage as a note record;

means for exiting the new note mode;

means for comparing a new window title when the note title for each new window displayed having a title; and means for displaying the note text at the note position responsive to the means for comparing.

14. The system of claim 13 further comprising:

second means for comparing, for each window being closed, the window title with the note title in each note record in the note dictionary; and means for removing the note text from the display responsive to the second means for comparing.

15. The system of claim 13 wherein the means for entering a new note mode further comprises means for detecting the pressing of the execute key when the pointer is positioned on a designated portion of a window associated with a note generating program.

16. The system of claim 13 wherein the means for entering a new note mode further comprises means for detecting the pressing of a designated key stroke sequence.

17. The system of claim 13 wherein means for entering a new note mode further comprises means for altering a default pointer display in a selected manner to visually indicate new note mode and means for exiting the new note mode further comprises means for restoring the default pointer display.

18. The system of claim 13 wherein the means for displaying text mode further comprises means for using selected visual display characteristics to display the note text to distinguish the note text from other text in the window or on the desktop.

* * * * *

UNITED STATES PATENT AND TRADEMARK OFFICE
CERTIFICATE OF CORRECTION

PATENT NO. : 5,596,700

DATED : January 21, 1997

INVENTOR(S) : Darnell et al.

It is certified that error appears in the above-identified patent and that said Letters Patent is hereby corrected as shown below:

Column 4, line 48, delete "comprises" and insert --comprise--.

Column 5, line 42, delete "interface" and insert --interfaces--.

Column 6, line 50, delete "wherein as" and insert --whereas the--.

Column 8, line 33, delete "(Line 208)" and insert --(line L208)--.

Column 11, claim 3, line 55, delete "to" and insert --by--.

Column 12, claim 9, line 40, delete "whole" and insert --window--.

Signed and Sealed this

Twenty-sixth Day of August, 1997

*Attest:*

BRUCE LEHMAN

*Attesting Officer*    *Commissioner of Patents and Trademarks*